(12) United States Patent
Kou et al.

(10) Patent No.: US 9,362,789 B2
(45) Date of Patent: Jun. 7, 2016

(54) MAGNETIC FIELD-MODULATED TRANSVERSE FLUX MULTIPHASE PERMANENT MAGNET MOTOR

(75) Inventors: Baoquan Kou, Harbin (CN); Dagang Xie, Harbin (CN); Jun Luo, Harbin (CN); Guolong Yang, Harbin (CN)

(73) Assignee: Harbin Institute of Technology, Harbin, Heilongjiang Province (CN)

( * ) Notice: Subject to any disclaimer, the term of this patent is extended or adjusted under 35 U.S.C. 154(b) by 331 days.

(21) Appl. No.: 14/129,282

(22) PCT Filed: Jul. 3, 2012

(86) PCT No.: PCT/CN2012/078088
§ 371 (c)(1),
(2), (4) Date: Dec. 24, 2013

(87) PCT Pub. No.: WO2013/078861
PCT Pub. Date: Jun. 6, 2013

(65) Prior Publication Data
US 2014/0125181 A1    May 8, 2014

(30) Foreign Application Priority Data
Nov. 30, 2011 (CN) .......................... 2011 1 0390301

(51) Int. Cl.
*H02K 21/12* (2006.01)
*H02K 1/27* (2006.01)
*H02K 21/04* (2006.01)
*H02K 3/12* (2006.01)

(52) U.S. Cl.
CPC ................ *H02K 1/2706* (2013.01); *H02K 3/12* (2013.01); *H02K 21/046* (2013.01)

(58) Field of Classification Search
CPC ..... H02K 1/2706; H02K 3/12; H02K 21/046; H02K 1/27; H02K 21/20; H02K 21/12; H02K 21/16; H02K 21/145; H02K 21/185; H02K 16/00
USPC .................. 310/156.02, 216.023, 181, 49.46, 310/49.43, 49.39
See application file for complete search history.

(56) References Cited

U.S. PATENT DOCUMENTS 6,888,272 B2 * 5/2005 Kastinger ............. E21B 17/028
310/49.08

* cited by examiner

Primary Examiner — Joshua Benitez-Rosario
Assistant Examiner — Alexander Moraza
(74) Attorney, Agent, or Firm — Novoclaims Patent Services LLC; Mei Lin Wong

(57) ABSTRACT

A magnetic field-modulated transverse flux multiphase permanent magnet motor consisting of a stator and a rotor. A number m of phase armature units are arranged in a row along the axial direction within a motor housing (1); each successive phase armature unit is offset in the circumferential direction by an electrical angle of 360°/m; the armature coil (2) is embedded within an annular cavity between the first to the third stator iron core tooth segments (3, 4, 5); the external circumferential surfaces of the first and the third rotor iron core tooth segments (6, 8) are respectively grooved in the axial direction with k/2 permanent magnet slots; the rotor permanent magnet slot on the first rotor iron core tooth segment (6) is axially offset from the rotor permanent magnet slot on the third rotor iron core tooth segment (8) by one-half the rotor tooth pitch; the direction of magnetization of the rotor permanent magnets (9) is identical. The present motor features high reliability and high security, high fault tolerance, structural simplicity, low costs, high torque density, good dynamic characteristics and ease of modularization.

20 Claims, 8 Drawing Sheets

A-A

E-E

MAGNETIC FIELD-MODULATED TRANSVERSE FLUX MULTIPHASE PERMANENT MAGNET MOTOR

CROSS REFERENCE OF RELATED APPLICATION

This is a national phase national application of an international patent application number PCT/CN2012/078088 with a filing date of Jul. 3, 2012, which claimed priority of a foreign application number 201110390301.6 with a filing date of Nov. 30, 2011 in China. The contents of these specifications, including any intervening amendments thereto, are incorporated herein by reference.

BACKGROUND OF THE PRESENT INVENTION

1. Field of Invention

The present invention relates to a transverse flux multiphase permanent magnet motor.

2. Description of Related Arts

Referring to FIG. 1 of the drawings, a schematic diagram of a conventional multiphase permanent magnet synchronous motor is illustrated. The conventional multiphase permanent magnet synchronous motor usually comprises a stator and a plurality of armature units distributed along the stator. Each armature units comprises a winding consisting of a large number of conductors. For this type of conventional armature units, the end portions of the armature units have extended lengths and may intersect with or overlap on each other. This construction causes great copper loss, the need of complicated insulation structure for each armature unit, and high manufacturing cost. Moreover, each armature unit may have magnetic coupling with other armature units, and this phenomena causes mutual inductance between the affected armature units, thus increasing the difficulty in controlling and ensuring the precision of the multiphase currents. On the other hand, this phenomena also causes long flux path and substantial stator iron loss for each armature unit. All these disadvantages substantially limit any significant increase or improvement in an overall efficiency of the conventional multiphase permanent magnet synchronous motor. At the same time, since the conventional multiphase permanent magnet synchronous motor utilizes the electromagnetic torque developed by the induction between the magnetic field generated by the permanent magnet rotor and the multiphase currents flowing through the stator, the torque density of conventional multiphase permanent magnet synchronous motor is relatively low, and this limitation in torque density substantially limits the range of applications of conventional multiphase permanent magnet synchronous motors.

SUMMARY OF THE PRESENT INVENTION

Technical Problems

In order to resolve the problems of low reliability, high energy loss, low torque density, and complicated structure of conventional multiphase permanent magnet synchronous motor, the present invention provides a magnetic field modulated transverse flux multiphase permanent magnet motor.

Technical Solutions

In a first aspect of the present invention, it provides a magnetic field modulated transverse flux multiphase permanent magnet motor, comprising a stator and a rotor, wherein the stator and the rotor are spaced apart from each other to form an air gap therebetween, the stator comprising a stator casing and m armature units, where m is a number of phases of the magnetic field modulated transverse flux multiphase permanent magnet motor, and m≥3, each of the armature units comprising an armature core and an armature winding, wherein each of the armature cores comprises n stator core teeth, wherein n is an integer, each of the stator core teeth having a first stator teeth section, a second stator teeth section, and a third stator teeth section, wherein each of the first stator teeth section, the second stator teeth section, and the third stator teeth section has an annular structure and has a same external diameter, the second stator teeth section being provided between the first stator teeth section and the third stator teeth section, wherein an internal diameter of the second stator teeth section is greater than that of the first stator teeth section and the third stator teeth section, while an internal diameter of the first stator teeth section is the same as that of the third stator teeth section, the first stator teeth section, the second stator teeth section, and the third stator teeth section being eccentrically arranged to share a common central longitudinal axis, the armature winding being embedded in a space formed between the first stator teeth section, the second stator teeth section and the third stator teeth section, the stator casing being tubular in structure, and having a plurality of casing slots forming on an inner surface thereof, wherein the casing slots are longitudinally formed along a longitudinal direction of the stator casing, wherein a number of casing slots formed on the stator casing is equal to a number of the stator core teeth, the stator core teeth being engaged with the casing slots respectively from a circumferential direction of the stator casing, wherein a transverse depth of each of the stator core teeth is greater than or equal to a transverse depth of the corresponding casing slot of the stator casing, the armature units being sequentially arranged along a longitudinal direction of the stator casing, wherein each of the armature units are distributed along the circumferential direction of the stator casing in such a manner that each of the armature units has an electrical angle of 360°/m, the rotor comprising a rotor core and k rotor permanent magnets, where k is an even number, wherein the rotor core has a first rotor core section, a second rotor core section, and a third rotor core section, each of the first rotor core section, the second rotor core section and the third rotor core section being annular in structure, and having an identical internal diameter, wherein the second rotor core section is positioned between the first rotor core section and the third rotor core section, wherein an external diameter of the second rotor core section is smaller than an external diameter of the first rotor core section and an external diameter of the third rotor core section, while the external diameter of the first rotor core section is identical to that of the third rotor core section, the first rotor core section, the second rotor core section and the third rotor core section being eccentrically arranged to share a common central longitudinal axis, wherein a thickness of the first rotor core section is identical to that of the first stator teeth section, while a thickness of the second rotor core section is identical to that of the second stator teeth section, and a thickness of the third rotor core section is identical to that of the third stator teeth section, wherein for each of the armature units, the first rotor core section, the second rotor core section, and the third rotor core section of the rotor core are aligned with the corresponding first stator teeth section, the fourth stator teeth section, and the third stator teeth section respectively, each of the first rotor core section and the third rotor core section further having k/2 magnet receiving slots longitudinally forming on an outer circumferential surface of the first rotor core section and the third rotor core section, in such a manner that the k/2 magnet receiving slots of the first rotor core section are evenly distributed along a circumferential direction thereof, while the k/2 magnet receiving slots of the third rotor core section are evenly distributed along a circumferential direction thereof, wherein with respect to the longitudinal direction of the rotor, the magnet receiving slots of the first rotor core section are arranged not to be aligned with the magnet receiving slots of the third rotor core section, the rotor permanent magnets being received in the magnet receiving slots respectively, wherein each of the rotor permanent magnets is elongated in shape and is arranged to create one of radial magnetization and parallel magnetization, the rotor permanent magnets having identical direction of magnetization, so that a polarity of each pole of each of the rotor permanent magnets with respect to the rotor is identical, wherein each of the rotor permanent magnets has one of a N-pole and a S-pole facing toward the air gap formed between the rotor and the stator.

In a second aspect of the present invention, it provides a magnetic field modulated transverse flux multiphase permanent magnet motor, comprising a stator and a rotor, wherein the stator and the rotor are spaced apart from each other to form an air gap therebetween, the stator comprising a stator casing and m armature units, where m is a number of phases of the magnetic field modulated transverse flux multiphase permanent magnet motor, and m≥3, the stator casing being tubular in structure, each of the armature units comprising an armature core and an armature winding, wherein each of the armature cores has a first armature core section, a second armature core section, and a third armature core section, each of the first armature core section, the second armature core section, and the third armature core section having an annular structure and an identical external diameter, the second armature core section being positioned between the first armature core section and the third armature core section, wherein an internal diameter of the second armature core section is greater than that of the first armature core section and the third armature core section, while an internal diameter of the first armature core section is identical to that of the third armature core section, the first armature core section, the second armature core section, and the third armature core section being eccentrically arranged to share the a common central longitudinal axis, and being sequentially and securely supported in the core casing along a longitudinal direction thereof, the first armature core section and the third armature core section having a plurality of stator core slots formed on an inner circumferential surface of the first armature core section and the third armature core section, wherein a number of the stator core slots forming on the first armature core section is equal to a number of the stator core slots forming on the third armature core section, wherein the stator core slots of the first armature core section are evenly distributed along a circumferential direction thereof, while the stator core slots of the third armature core section are evenly distributed along a circumferential direction thereof, wherein the stator core slots forming on the first armature core section are symmetrically distributed with respect to the stator core slots forming on the third armature core section, the armature winding being embedded in a space formed between the first armature core section, the second armature core section, and the third armature core section, wherein the m armature units are sequentially and securely supported in the core casing along a longitudinal direction thereof, each of the armature units being distributed along a circumferential direction of the stator casing in such a manner that each of the armature units has an electrical angle of 360°/m, the rotor comprising a rotor core and k rotor permanent magnets, where k is an even number, the rotor core having a first rotor core section, a second rotor core section, and a third rotor core section, each of the first rotor core section, the second rotor core section and the third rotor core section being annular in structure, and having an identical internal diameter, wherein the second rotor core section is positioned between the first rotor core section and the third rotor core section, wherein an external diameter of the second rotor core section is smaller than an external diameter of the first rotor core section and an external diameter of the third rotor core section, while the external diameter of the first rotor core section is identical to that of the third rotor core section, the first rotor core section, the second rotor core section and the third rotor core section being eccentrically arranged to share a common central longitudinal axis, wherein a thickness of the first rotor core section is identical to that of the first armature core section, while a thickness of the second rotor core section is identical to that of the second armature core section, and a thickness of the third rotor core section is identical to that of the third armature core section, each of the first rotor core section and the third rotor core section further having k/2 magnet receiving slots longitudinally forming on an outer circumferential surface of the first rotor core section and the third rotor core section, in such a manner that the k/2 magnet receiving slots of the first rotor core section are evenly distributed along a circumferential direction thereof, while the k/2 magnet receiving slots of the third rotor core section are evenly distributed along a circumferential direction thereof, the magnet receiving slots of the first rotor core section being arranged not to be aligned with the magnet receiving slots of the third rotor core section with respect to the longitudinal direction of the rotor, wherein the magnet receiving slots of the first rotor core section are aligned with the stator core slots of the first armature core section respectively, while the magnet receiving slots of the third rotor core section are aligned with the stator core slots of the third armature core section respectively, such that the magnet receiving slots are positioned to correspond to the positions of the stator core slots respectively, the rotor permanent magnets being received in the magnet receiving slots respectively, wherein each of the rotor permanent magnets is elongated in shape and is arranged to create one of radial magnetization and parallel magnetization, the rotor permanent magnets having identical direction of magnetization, so that a polarity of each pole of each of the rotor permanent magnets with respect to the rotor is identical, wherein each of the rotor permanent magnets has one of a N-pole and a S-pole facing toward the air gap formed between the rotor and the stator.

In a third aspect of the present invention, it provides a magnetic field modulated transverse flux multiphase permanent magnet motor, comprising a stator and a rotor, wherein the stator and the rotor are spaced apart from each other to form an air gap therebetween, the stator comprising a stator casing and m armature units, where m is a number of phases of the magnetic field modulated transverse flux multiphase permanent magnet motor, and m≥3, the stator casing being tubular in structure, each of the armature units comprising an armature core and an armature winding, wherein each of the armature cores has a first armature core section, a second armature core section, and a third armature core section, each of the first armature core section, the second armature core section, and the third armature core section having an annular structure and an identical external diameter, the second armature core section being positioned between the first armature core section and the third armature core section, wherein an internal diameter of the second armature core section is greater than that of the first armature core section and the third armature core section, while an internal diameter of the first armature core section is identical to that of the third armature core section, the first armature core section, the second armature core section, and the third armature core section being eccentrically arranged to share the a common central longitudinal axis, and being sequentially and securely supported in the core casing along a longitudinal direction thereof, the first armature core section and the third armature core section having a plurality of stator core slots formed on an inner circumferential surface of the first armature core section and the third armature core section, wherein the stator core slots are longitudinally formed along a longitudinal direction of the stator casing, wherein a number of the stator core slots forming on the first armature core section is equal to a number of the stator core slots forming on the third armature core section, wherein the stator core slots of the first armature core section are evenly distributed along a circumferential direction thereof, while the stator core slots of the third armature core section are evenly distributed along a circumferential direction thereof, wherein, the stator core slots of the first armature core section are arranged not to be aligned with the stator core slots of the third armature core section with respect to the radial direction of the stator, the armature winding being embedded in a space formed between the first armature core section, the second armature core section, and the third armature core section, wherein the m armature units are sequentially and securely supported in the core casing along a longitudinal direction thereof, each of the armature units being distributed along a circumferential direction of the stator casing in such a manner that each of the armature units has an electrical angle of 360°/m, the rotor comprising a rotor core and k rotor permanent magnets, where k is an even number, the rotor core having a first rotor core section, a second rotor core section, and a third rotor core section, each of the first rotor core section, the second rotor core section and the third rotor core section being annular in structure, and having an identical internal diameter, wherein the second rotor core section is positioned between the first rotor core section and the third rotor core section, wherein an external diameter of the second rotor core section is smaller than an external diameter of the first rotor core section and an external diameter of the third rotor core section, while the external diameter of the first rotor core section is identical to that of the third rotor core section, the first rotor core section, the second rotor core section and the third rotor core section being eccentrically arranged to share a common central longitudinal axis, wherein a thickness of the first rotor core section is identical to that of the first armature core section, while a thickness of the second rotor core section is identical to that of the second armature core section, and a thickness of the third rotor core section is identical to that of the third armature core section, each of the first rotor core section and the third rotor core section further having k/2 magnet receiving slots longitudinally forming on an outer circumferential surface of the first rotor core section and the third rotor core section, in such a manner that the k/2 magnet receiving slots of the first rotor core section are evenly distributed along a circumferential direction thereof, while the k/2 magnet receiving slots of the third rotor core section are evenly distributed along a circumferential direction thereof, wherein a number of the magnet receiving slots forming on the third rotor core section is identical to a number of the stator core slots forming on the third armature core section, wherein the rotor permanent magnets are received in the magnet receiving slots respectively, wherein each of the rotor permanent magnets is elongated in shape and is arranged to create one of radial magnetization and parallel magnetization, the rotor permanent magnets having identical direction of magnetization, so that a polarity of each pole of each of the rotor permanent magnets with respect to the rotor is identical, wherein each of the rotor permanent magnets has one of a N-pole and a S-pole facing toward the air gap formed between the rotor and the stator.

In a fourth aspect of the present invention, it provides a magnetic field modulated transverse flux multiphase permanent magnet motor, comprising a stator and a rotor, wherein the stator and the rotor are spaced apart from each other to form an air gap therebetween, the stator comprising a stator casing and m armature units, where m is a number of phases of the magnetic field modulated transverse flux multiphase permanent magnet motor, and m≥3, the stator casing being tubular in structure, each of the armature units comprising an armature core and an armature winding, and k stator permanent magnets, where k is an even number, wherein each of the armature cores has a first armature core section, a second armature core section, and a third armature core section, each of the first armature core section, the second armature core section, and the third armature core section having an annular structure and an identical external diameter, the second armature core section being positioned between the first armature core section and the third armature core section, wherein an internal diameter of the second armature core section is greater than that of the first armature core section and the third armature core section, while an internal diameter of the first armature core section is identical to that of the third armature core section, the first armature core section, the second armature core section, and the third armature core section being eccentrically arranged to share the a common central longitudinal axis, and being sequentially and securely supported in the core casing along a longitudinal direction thereof, the first armature core section and the third armature core section having k/2 stator core slots forming on an inner circumferential surface of the first armature core section and the third armature core section, wherein the stator core slots of the first armature core section are evenly distributed along a circumferential direction thereof, while the stator core slots of the third armature core section are evenly distributed along a circumferential direction thereof, wherein the stator core slots forming on the first armature core section are symmetrically distributed with respect to the stator core slots forming on the third armature core section, the k stator permanent magnets being received in the stator core slots of the first armature core section and the third armature core section respectively, wherein each of the stator permanent magnets is elongated in shape and is arranged to create one of radial magnetization and parallel magnetization, the stator permanent magnets having identical direction of magnetization, so that a polarity of each pole of each of the stator permanent magnets with respect to the stator is identical, wherein each of the stator permanent magnets has one of a N-pole and a S-pole facing toward the air gap formed between the rotor and the stator, the armature winding being embedded in a space formed between the first armature core section, the second armature core section, and the third armature core section, wherein the m armature units are sequentially and securely supported in the core casing along a longitudinal direction thereof, each of the armature units being distributed along a circumferential direction of the stator casing in such a manner that each of the armature units has an electrical angle of 360°/m, the rotor comprising a rotor core and k rotor permanent magnets, where k is an even number, the rotor core having a first rotor core section, a second rotor core section, and a third rotor core section, each of the first rotor core section, the second rotor core section and the third rotor core section being annular in structure, and having an identical internal diameter, wherein the second rotor core section is positioned between the first rotor core section and the third rotor core section, wherein an external diameter of the second rotor core section is smaller than an external diameter of the first rotor core section and an external diameter of the third rotor core section, while the external diameter of the first rotor core section is identical to that of the third rotor core section, the first rotor core section, the second rotor core section and the third rotor core section being eccentrically arranged to share a common central longitudinal axis, wherein a thickness of the first rotor core section is identical to that of the first armature core section, while a thickness of the second rotor core section is identical to that of the second armature core section, and a thickness of the third rotor core section is identical to that of the third armature core section, each of the first rotor core section and the third rotor core section further having k/2 magnet receiving slots longitudinally forming on an outer circumferential surface of the first rotor core section and the third rotor core section, in such a manner that the k/2 magnet receiving slots of the first rotor core section are evenly distributed along a circumferential direction thereof, while the k/2 magnet receiving slots of the third rotor core section are evenly distributed along a circumferential direction thereof, the magnet receiving slots of the first rotor core section being arranged not to be aligned with the magnet receiving slots of the third rotor core section 8 with respect to the longitudinal direction of the rotor, wherein the magnet receiving slots of the first rotor core section are aligned with the stator core slots of the first armature core section respectively, while the magnet receiving slots of the third rotor core section are aligned with the stator core slots of the third armature core section respectively, such that the magnet receiving slots are positioned to correspond to the positions of the stator core slots respectively, the rotor permanent magnets being received in the magnet receiving slots respectively, wherein each of the rotor permanent magnets is elongated in shape and is arranged to create one of radial magnetization and parallel magnetization, the rotor permanent magnets having identical direction of magnetization, so that a polarity of each pole of each of the rotor permanent magnets with respect to the rotor is identical, wherein each of the rotor permanent magnets has one of a N-pole and a S-pole facing toward the air gap formed between the rotor and the stator, the rotor permanent magnets and the stator permanent magnets have the an identical magnetization direction.

In a fifth aspect of the present invention, it provides a magnetic field modulated transverse flux multiphase permanent magnet motor, comprising a stator and a rotor, wherein the stator and the rotor are spaced apart from each other to form an air gap therebetween, the stator comprising a stator casing and m armature units, where m is a number of phases of the magnetic field modulated transverse flux multiphase permanent magnet motor, and m≥3, the stator casing being tubular in structure, each of the armature units comprising an armature core and an armature winding, and k stator permanent magnets, where k is an even number, wherein each of the armature cores has a first armature core section, a second armature core section, and a third armature core section, each of the first armature core section, the second armature core section, and the third armature core section having an annular structure and an identical external diameter, the second armature core section being positioned between the first armature core section and the third armature core section, wherein an internal diameter of the second armature core section is greater than that of the first armature core section and the third armature core section, while an internal diameter of the first armature core section is identical to that of the third armature core section, the first armature core section, the second armature core section, and the third armature core section, and the third armature core section being eccentrically arranged to share the a common central longitudinal axis, and being sequentially and securely supported in the core casing along a longitudinal direction thereof, the first armature core section and the third armature core section having k/2 stator core slots forming on an inner circumferential surface of the first armature core section and the third armature core section, wherein the stator core slots of the first armature core section are evenly distributed along a circumferential direction thereof, while the stator core slots of the third armature core section are evenly distributed along a circumferential direction thereof, the stator core slots forming on the first armature core section being arranged not to be aligned with the stator core slots forming on the third armature core section with respect to the circumferential direction of the stator, the k stator permanent magnets being received in the stator core slots of the first armature core section and the third armature core section respectively, wherein each of the stator permanent magnets is elongated in shape and is arranged to create one of radial magnetization and parallel magnetization, the stator permanent magnets having identical direction of magnetization, so that a polarity of each pole of each of the stator permanent magnets with respect to the stator is identical, wherein each of the stator permanent magnets has one of a N-pole and a S-pole facing toward the air gap formed between the rotor and the stator, the armature winding being embedded in a space formed between the first armature core section, the second armature core section, and the third armature core section, wherein the m armature units are sequentially and securely supported in the core casing along a longitudinal direction thereof, each of the armature units being distributed along a circumferential direction of the stator casing in such a manner that each of the armature units has an electrical angle of 360°/m, the rotor being tubular in structure, and having k/2 magnet receiving slots longitudinally and evenly forming on an outer circumferential surface of the rotor, the rotor further comprising a plurality of rotor permanent magnets received in the magnet receiving slots respectively, wherein each of the rotor permanent magnets is elongated in shape and is arranged to create one of radial magnetization and parallel magnetization, the rotor permanent magnets having identical direction of magnetization, so that a polarity of each pole of each of the rotor permanent magnets with respect to the rotor is identical, wherein each of the rotor permanent magnets has one of a N-pole and a S-pole facing toward the air gap formed between the rotor and the stator, the rotor permanent magnets and the stator permanent magnets having an identical magnetization direction.

Beneficial Effects

The present invention provides a magnetic field modulated transverse flux multiphase permanent magnet motor which has the advantages of having relatively high reliability, low energy loss, high torque density, low manufacturing cost, and simple structure.

DETAILED DESCRIPTION OF THE PREFERRED EMBODIMENT

Embodiment 1

Figure 1:
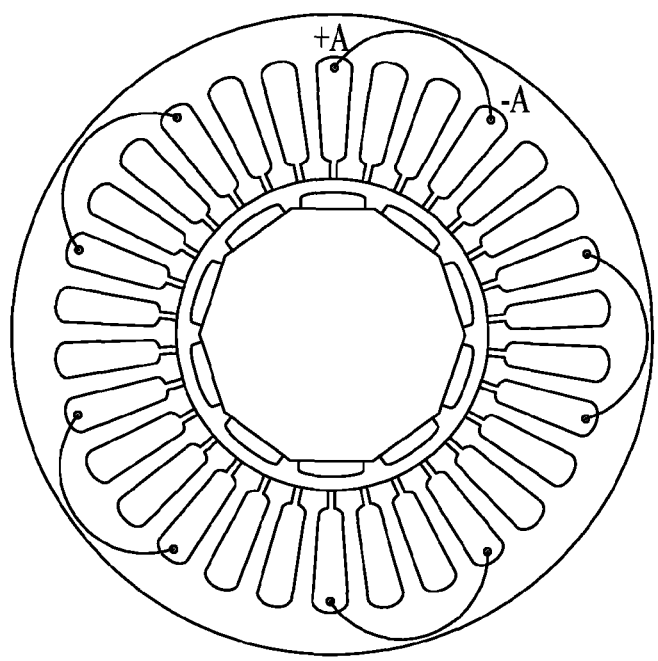
FIG. 1 is a schematic diagram of a conventional multiphase permanent magnet synchronous motor.
Figure 2:
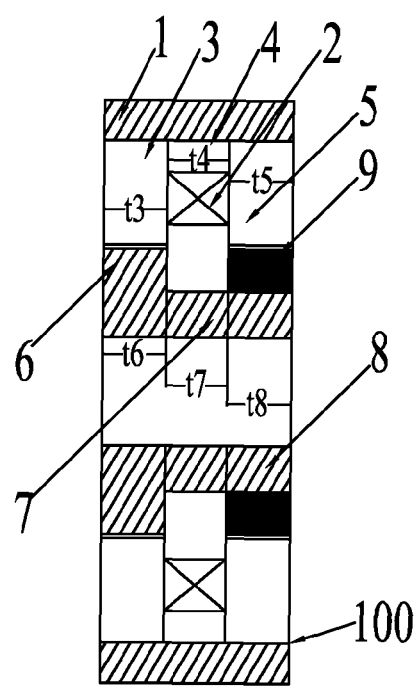
FIG. 2 is a sectional side view of an armature unit of a magnetic field modulated transverse flux multiphase permanent magnet motor according to a first preferred embodiment of the present invention.
Figure 3:
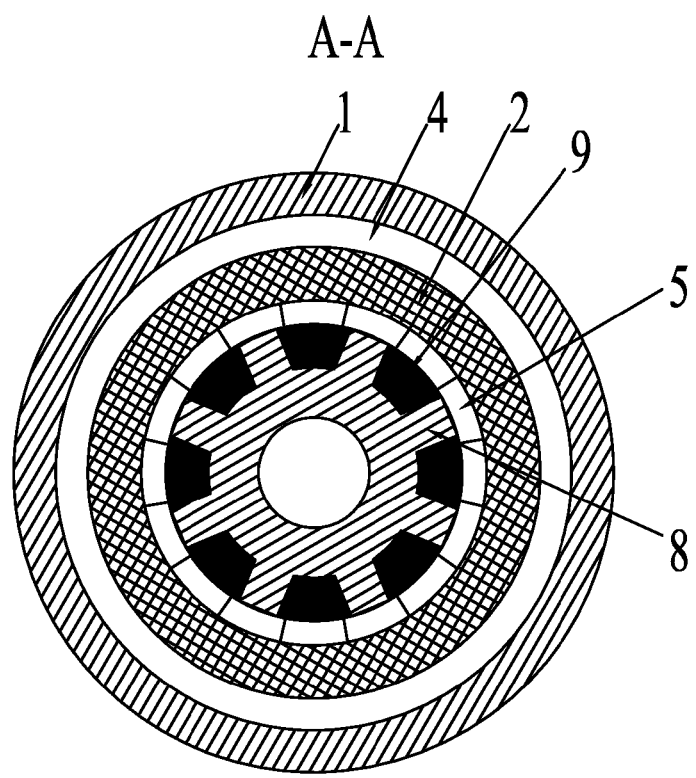
FIG. 3 is a sectional view of the armature unit of the magnetic field modulated transverse flux multiphase permanent magnet motor along plane A-A of FIG. 2.
Figure 4:
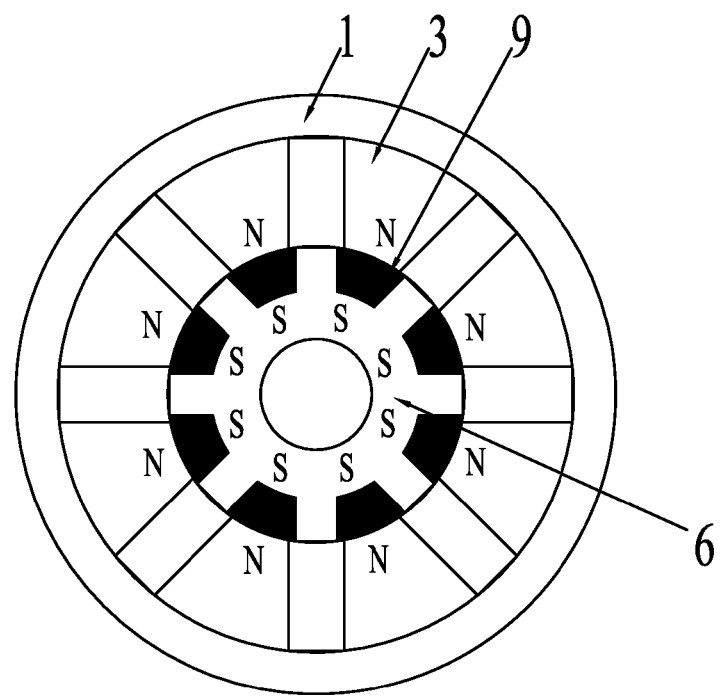
FIG. 4 is a right side view of the armature unit of the magnetic field modulated transverse flux multiphase permanent magnet motor according to the first preferred embodiment of the present invention.

Referring to FIG. 2 to FIG. 4 of the drawings, schematic diagrams of a magnetic field modulated transverse flux multiphase permanent magnet motor are illustrated, in which it comprises a stator and a rotor, wherein the stator and the rotor is spaced apart from each other to form an air gap therebetween. The stator comprises a stator casing 1 and m armature units, where m is the number of phases of the magnetic field modulated transverse flux multiphase permanent magnet motor, and m≥3. Each of the armature units comprises an armature core and an armature winding 2. Each of the armature cores comprises n stator core teeth, wherein n is an integer. Each of the stator core teeth has a first stator teeth section 3, a second stator teeth section 4, and a third stator teeth section 5. Each of the first stator teeth section 3, the second stator teeth section 4, and the third stator teeth section 5 has an annular structure or cross section and has the same external diameter. Moreover, the second stator teeth section 4 is positioned between the first stator teeth section 3 and the third stator teeth section 5, wherein an internal diameter of the second stator teeth section 4 is greater than that of the first stator teeth section 3 and the third stator teeth section 5, while an internal diameter of the first stator teeth section 3 is the same as that of the third stator teeth section 5. The first stator teeth section 3, the second stator teeth section 4, and the third stator teeth section 5 are eccentrically arranged so that they share the same central longitudinal axis. The armature winding 2 is embedded in a space formed between the first stator teeth section 3, the second stator teeth section 4 and the third stator teeth section 5. The stator casing 1 is tubular in structure. The stator casing 1 has a plurality of casing slots 100 formed on an inner surface thereof, wherein the casing slots 100 are longitudinally formed along a longitudinal direction of the stator casing 1. The number of casing slots 100 formed on the stator casing 1 is equal to the number of stator core teeth. The stator core teeth are engaged with the casing slots 100 respectively from a circumferential direction of the stator casing 1. Moreover a transverse depth of each of the stator core teeth is greater than or equal to a transverse depth of the corresponding casing slot 100 of the stator casing 1. The armature units are sequentially arranged along a longitudinal direction of the stator casing 1, wherein each of the armature units are distributed along the circumferential direction of the stator casing 1 in such a manner that each of the armature units has an electrical angle of 360°/m. The rotor comprises a rotor core and k rotor permanent magnets 9, where k is an even number. The rotor core has a first rotor core section 6, a second rotor core section 7, and a third rotor core section 8. Each of the first rotor core section 6, the second rotor core section 7 and the third rotor core section 8 is annular in structure, and they have the same internal diameter. The second rotor core section 7 is positioned between the first rotor core section 6 and the third rotor core section 8, wherein an external diameter of the second rotor core section 7 is smaller than an external diameter of the first rotor core section 6 and an external diameter of the third rotor core section 8. Note that the external diameter of the first rotor core section 6 is the same as that of the third rotor core section 8. The first rotor core section 6, the second rotor core section 7 and the third rotor core section 8 are eccentrically arranged so that they share the same central longitudinal axis. A thickness $t_6$ of the first rotor core section 6 is the same as a thickness $t_3$ of the first stator teeth section 3, while a thickness $t_7$ of the second rotor core section 7 is the same as a thickness $t_4$ of the second stator teeth section 4, and a thickness $t_8$ of the third rotor core section 8 is the same as a thickness $t_5$ of the third stator teeth section 5. For each of the armature units, the first rotor core section 6, the second rotor core section 7, and the third rotor core section 8 of the rotor core are aligned with the corresponding first stator teeth section 3, the fourth stator teeth section 4, and the third stator teeth section 5 respectively. Furthermore, each of the first rotor core section 6 and the third rotor core section 8 further has k/2 magnet receiving slots longitudinally formed on an outer surface of the first rotor core section 6 and the third rotor core section 8, in such a manner that the k/2 magnet receiving slots of the first rotor core section 6 are evenly distributed along a circumferential direction thereof, while the k/2 magnet receiving slots of the third rotor core section 8 are also evenly distributed along a circumferential direction thereof. With respect to the longitudinal direction of the rotor, the magnet receiving slots of the first rotor core section 6 are arranged not to be aligned (i.e. offset) with the magnet receiving slots of the third rotor core section 8 by a half pitch distance. The rotor permanent magnets 9 are received in the magnet receiving slots respectively. Each of the rotor permanent magnets 9 is elongated in shape and may be arranged to create radial magnetization or parallel magnetization. The rotor permanent magnets 9 have the same direction or polarity of magnetization. In other words, the polarity of each pole of each of the rotor permanent magnets 9 with respect to the rotor is the same. Thus, each of the rotor permanent magnets 9 may have its N-pole or S-pole facing toward the air gap formed between the rotor and the stator.

Embodiment 2

Figure 5:
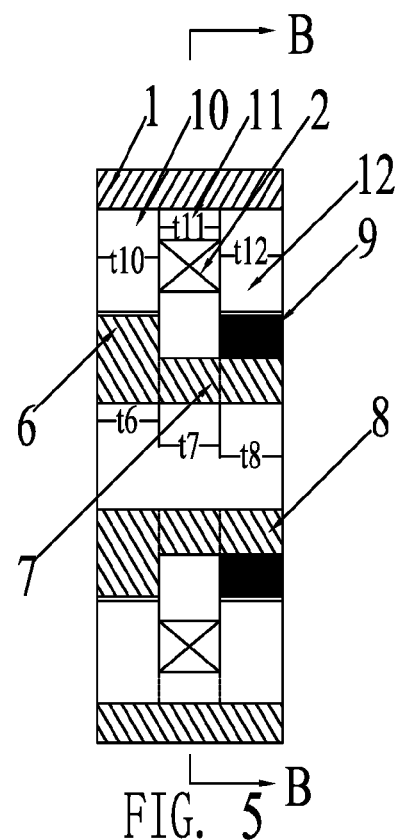
FIG. 5 is a sectional side view of an armature unit of a magnetic field modulated transverse flux multiphase permanent magnet motor according to a second preferred embodiment of the present invention.
Figure 6:
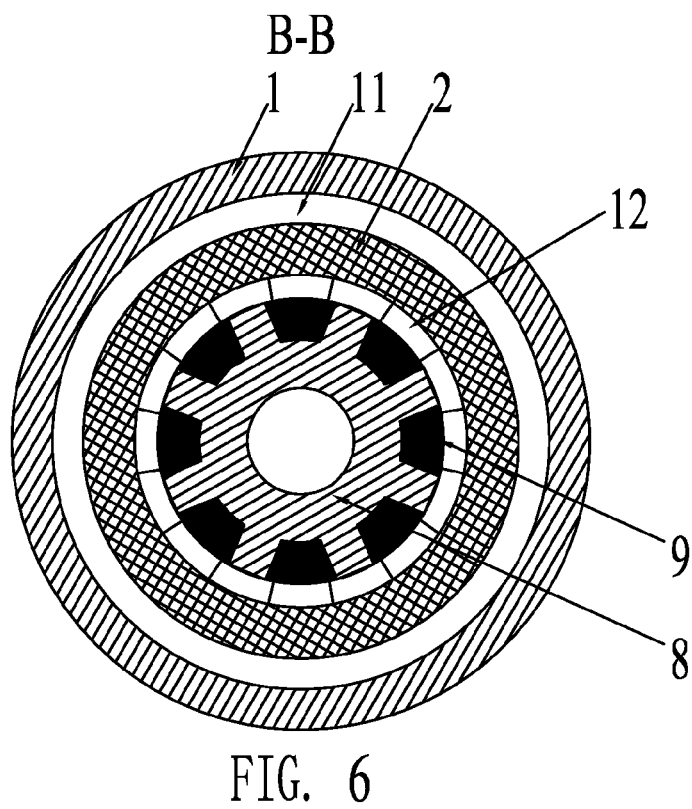
FIG. 6 is a sectional view of the armature unit of the magnetic field modulated transverse flux multiphase permanent magnet motor along plane B-B of FIG. 5.
Figure 7:
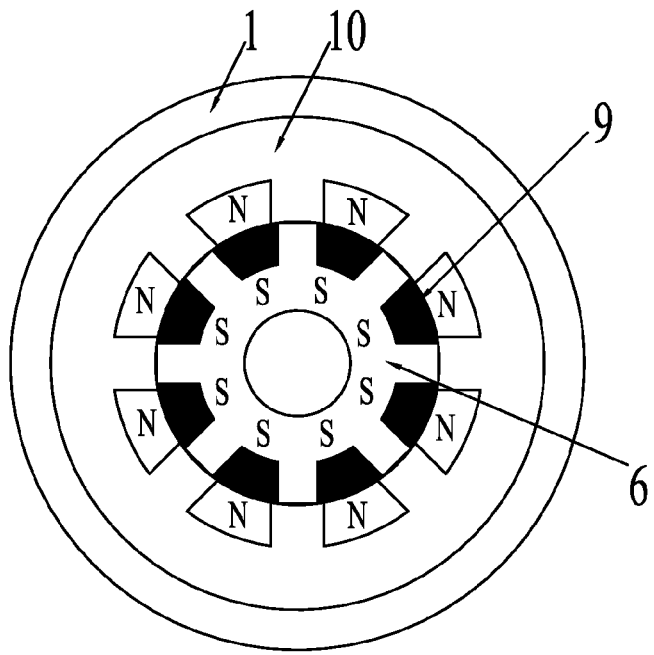
FIG. 7 is a right side view of the armature unit of the magnetic field modulated transverse flux multiphase permanent magnet motor according to the second preferred embodiment of the present invention.

Referring to FIG. 5 to FIG. 7 of the drawings, schematic diagrams of a magnetic field modulated transverse flux multiphase permanent magnet motor are illustrated, in which it comprises a stator and a rotor, wherein the stator and the rotor is spaced apart from each other to form an air gap therebetween. The stator comprises a stator casing 1 and m armature units, where m is the number of phases of the magnetic field modulated transverse flux multiphase permanent magnet motor, and m≥3. The stator casing 1 is tubular in structure. Each of the armature units comprises an armature core and an armature winding 2. The armature core has a first armature core section 10, a second armature core section 11, and a third armature core section 12. Each of the first armature core section 10, the second armature core section 11, and the third armature core section 12 has an annular structure or cross section and has the same external diameter. Moreover, the second armature core section 11 is positioned between the first armature core section 10 and the third armature core section 12, wherein an internal diameter of the second armature core section 11 is greater than that of the first armature core section 10 and the third armature core section 12, while an internal diameter of the first armature core section 10 is the same as that of the third armature core section 12. The first armature core section 10, the second armature core section 11, and the third armature core section 12 are eccentrically arranged so that they share the same central longitudinal axis, and are sequentially and securely supported in the core casing 1 along a longitudinal direction thereof. The first armature core section 10 and the third armature core section 12 has a plurality of stator core slots formed on an inner circumferential surface of the first armature core section 10 and the third armature core section 12, wherein the stator core slots are longitudinally formed along a longitudinal direction of the stator casing 1. The number of stator core slots formed on the first armature core section 10 is equal to the number of the stator core slots formed on the third armature core section 12. The stator core slots of the first armature core section 10 are evenly distributed along a circumferential direction thereof. Similarly, the stator core slots of the third armature core section 12 are evenly distributed along a circumferential direction thereof. The stator core slots formed on the first armature core section 10 are symmetrically distributed with respect to the stator core slots formed on the third armature core section 12. The armature winding 2 is embedded in a space formed between the first armature core section 10, the second armature core section 11, and the third armature core section 12. The m armature units are sequentially and securely supported in the core casing 1 along a longitudinal direction thereof. Each of the armature units are distributed along the circumferential direction of the stator casing 1 in such a manner that each of the armature units has an electrical angle of 360°/m. The rotor comprises a rotor core and k rotor permanent magnets 9, where k is an even number. The rotor core has a first rotor core section 6, a second rotor core section 7, and a third rotor core section 8. Each of the first rotor core section 6, the second rotor core section 7 and the third rotor core section 8 is annular in structure, and they have the same internal diameter. The second rotor core section 7 is positioned between the first rotor core section 6 and the third rotor core section 8, wherein an external diameter of the second rotor core section 7 is smaller than an external diameter of the first rotor core section 6 and an external diameter of the third rotor core section 8. Note that the external diameter of the first rotor core section 6 is the same as that of the third rotor core section 8. The first rotor core section 6, the second rotor core section 7 and the third rotor core section 8 are eccentrically arranged so that they share the same central longitudinal axis. A thickness $t_6$ of the first rotor core section 6 is the same as a thickness $t_{10}$ of the first armature core section 10, while a thickness $t_7$ of the second rotor core section 7 is the same as a thickness $t_{11}$ of the second armature core section 11, and a thickness $t_8$ of the third rotor core section 8 is the same as a thickness $t_{12}$ of the third armature core section 12. Each of the first rotor core section 6 and the third rotor core section 8 further has k/2 magnet receiving slots longitudinally formed on an outer circumferential surface of the first rotor core section 6 and the third rotor core section 8, in such a manner that the k/2 magnet receiving slots of the first rotor core section 6 are evenly distributed along a circumferential direction thereof, while the k/2 magnet receiving slots of the third rotor core section 8 are also evenly distributed along a circumferential direction thereof. With respect to the longitudinal direction of the rotor, the magnet receiving slots of the first rotor core section 6 are arranged not to be aligned (i.e. offset) with the magnet receiving slots of the third rotor core section 8 by a half pitch distance. The magnet receiving slots of the first rotor core section 6 correspond to (i.e. are aligned with) the stator core slots of the first armature core section 10 respectively, while the magnet receiving slots of the third rotor core section 8 correspond to (i.e. aligned with) the stator core slots of the third armature core section 12 respectively. In other words, the magnet receiving slots are positioned to correspond to the positions of the stator core slots respectively. The rotor permanent magnets 9 are received in the magnet receiving slots respectively. Each of the rotor permanent magnets 9 is elongated in shape and may be arranged to create radial magnetization or parallel magnetization. The rotor permanent magnets 9 have the same direction or polarity of magnetization. In other words, the polarity of each pole of each of the rotor permanent magnets 9 with respect to the rotor is the same. Thus, each of the rotor permanent magnets 9 may have its N-pole or S-pole facing toward the air gap formed between the rotor and the stator.

Embodiment 3

Figure 8:
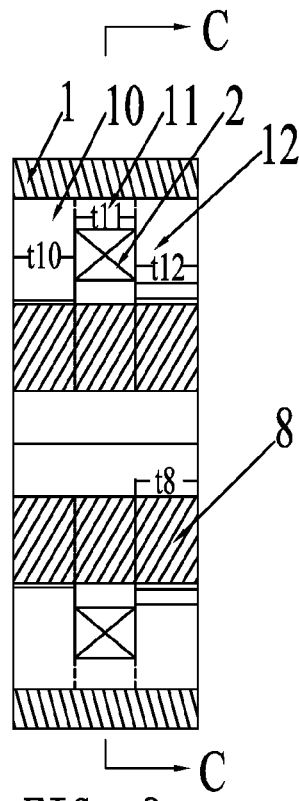
FIG. 8 is a sectional side view of an armature unit of a magnetic field modulated transverse flux multiphase permanent magnet motor according to a third preferred embodiment of the present invention.
Figure 9:
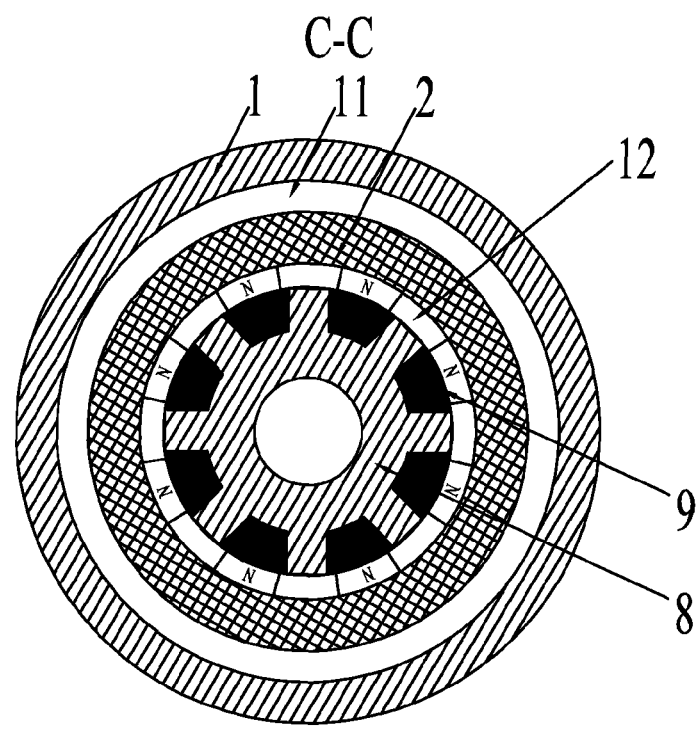
FIG. 9 is a sectional view of the armature unit of the magnetic field modulated transverse flux multiphase permanent magnet motor along plane C-C of FIG. 8.
Figure 10:
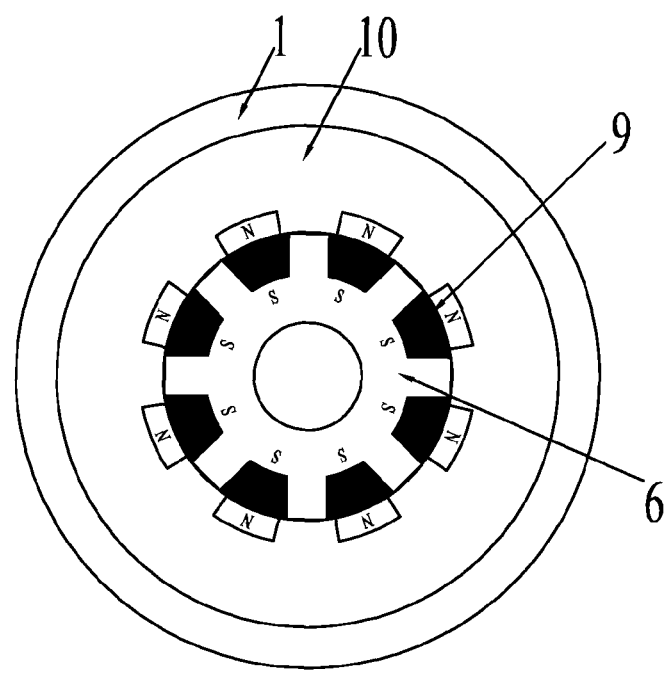
FIG. 10 is a right side view of the armature unit of the magnetic field modulated transverse flux multiphase permanent magnet motor according to the third preferred embodiment of the present invention.

Referring to FIG. 8 to FIG. 10 of the drawings, schematic diagrams of a magnetic field modulated transverse flux multiphase permanent magnet motor are illustrated, in which it comprises a stator and a rotor, wherein the stator and the rotor is spaced apart from each other to form an air gap therebetween. The stator comprises a stator casing 1 and m armature units, where m is the number of phases of the magnetic field modulated transverse flux multiphase permanent magnet motor, and m≥3. The stator casing 1 is tubular in structure. Each of the armature units comprises an armature core and an armature winding 2. The armature core has a first armature core section 10, a second armature core section 11, and a third armature core section 12. Each of the first armature core section 10, the second armature core section 11, and the third armature core section 12 has an annular structure or cross section and has the same external diameter. Moreover, the second armature core section 11 is positioned between the first armature core section 10 and the third armature core section 12, wherein an internal diameter of the second armature core section 11 is greater than that of the first armature core section 10 and the third armature core section 12, while an internal diameter of the first armature core section 10 is the same as that of the third armature core section 12. The first armature core section 10, the second armature core section 11, and the third armature core section 12 are eccentrically arranged so that they share the same central longitudinal axis, and are sequentially and securely supported in the core casing 1 along a longitudinal direction thereof. The first armature core section 10 and the third armature core section 12 has a plurality of stator core slots formed on an inner circumferential surface of the first armature core section 10 and the third armature core section 12, wherein the stator core slots are longitudinally formed along a longitudinal direction of the stator casing 1. The number of stator core slots formed on the first armature core section 10 is equal to the number of the stator core slots formed on the third armature core section 12. The stator core slots of the first armature core section 10 are evenly distributed along a circumferential direction thereof. Similarly, the stator core slots of the third armature core section 12 are evenly distributed along a circumferential direction thereof. With respect to the radial direction of the stator, the stator core slots of the first armature core section 10 are arranged not to be aligned (i.e. offset) with the stator core slots of the third armature core section 12 by a half pitch distance. The armature winding 2 is embedded in a space formed between the first armature core section 10, the second armature core section 11, and the third armature core section 12. The m armature units are sequentially and securely supported in the core casing 1 along a longitudinal direction thereof. Each of the armature units are distributed along the circumferential direction of the stator casing 1 in such a manner that each of the armature units has an electrical angle of 360°/m. The rotor comprises a rotor core and k rotor permanent magnets 9, where k is an even number. The rotor core has a first rotor core section 6, a second rotor core section 7, and a third rotor core section 8. Each of the first rotor core section 6, the second rotor core section 7 and the third rotor core section 8 is annular in structure, and they have the same internal diameter. The second rotor core section 7 is positioned between the first rotor core section 6 and the third rotor core section 8, wherein an external diameter of the second rotor core section 7 is smaller than an external diameter of the first rotor core section 6 and an external diameter of the third rotor core section 8. Note that the external diameter of the first rotor core section 6 is the same as that of the third rotor core section 8. The first rotor core section 6, the second rotor core section 7 and the third rotor core section 8 are eccentrically arranged so that they share the same central longitudinal axis. A thickness $t_6$ of the first rotor core section 6 is the same as a thickness $t_{10}$ of the first armature core section 10, while a thickness $t_7$ of the second rotor core section 7 is the same as a thickness $t_{11}$ of the second armature core section 11, and a thickness $t_8$ of the third rotor core section 8 is the same as a thickness $t_{12}$ of the third armature core section 12. Each of the first rotor core section 6 and the third rotor core section 8 further has k/2 magnet receiving slots longitudinally formed on an outer circumferential surface of the first rotor core section 6 and the third rotor core section 8, in such a manner that the k/2 magnet receiving slots of the first rotor core section 6 are evenly distributed along a circumferential direction thereof, while the k/2 magnet receiving slots of the third rotor core section 8 are also evenly distributed along a circumferential direction thereof. The number of magnet receiving slots formed on the third rotor core section is the same as the number of stator core slots formed on the third armature core section 12. The rotor permanent magnets 9 are received in the magnet receiving slots respectively. Each of the rotor permanent magnets 9 is elongated in shape and may be arranged to create radial magnetization or parallel magnetization. The rotor permanent magnets 9 have the same direction or polarity of magnetization. In other words, the polarity of each pole of each of the rotor permanent magnets 9 with respect to the rotor is the same. Thus, each of the rotor permanent magnets 9 may have its N-pole or S-pole facing toward the air gap formed between the rotor and the stator.

Embodiment 4

Figure 11:
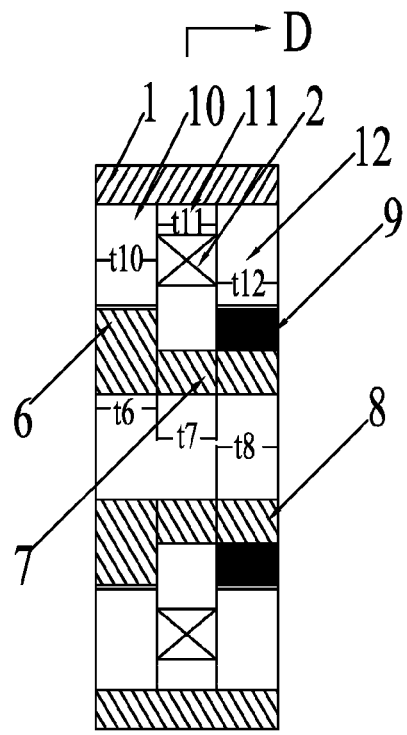
FIG. 11 is a sectional side view of an armature unit of a magnetic field modulated transverse flux multiphase permanent magnet motor according to a fourth preferred embodiment of the present invention.
Figure 12:
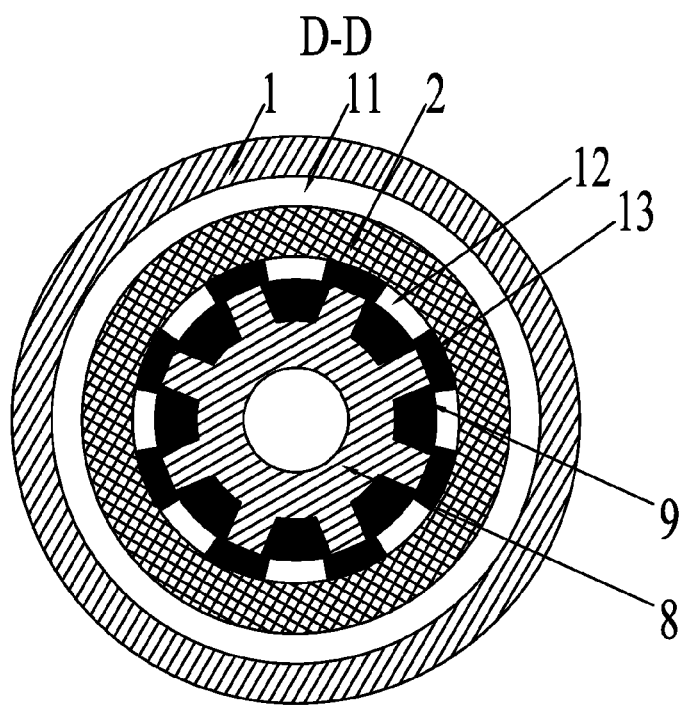
FIG. 12 is a sectional view of the armature unit of the magnetic field modulated transverse flux multiphase permanent magnet motor along plane D-D of FIG. 11.
Figure 13:
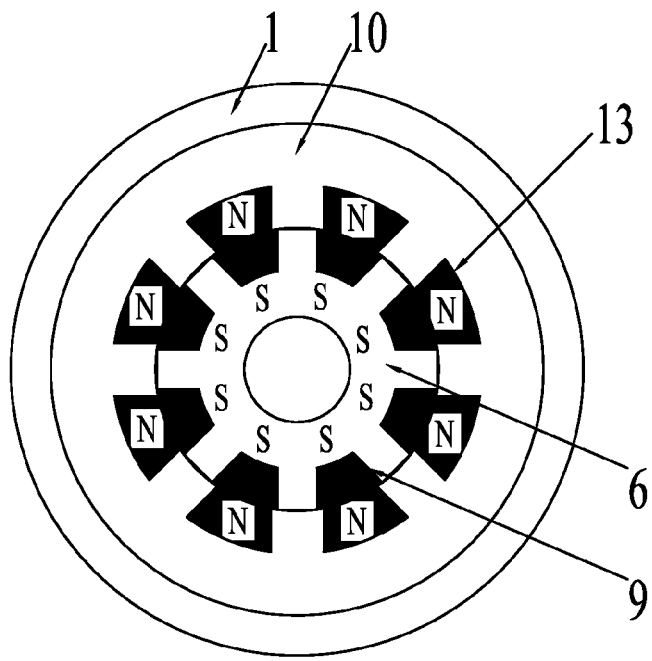
FIG. 13 is a right side view of the armature unit of the magnetic field modulated transverse flux multiphase permanent magnet motor according to the fourth preferred embodiment of the present invention.
Figure 14:
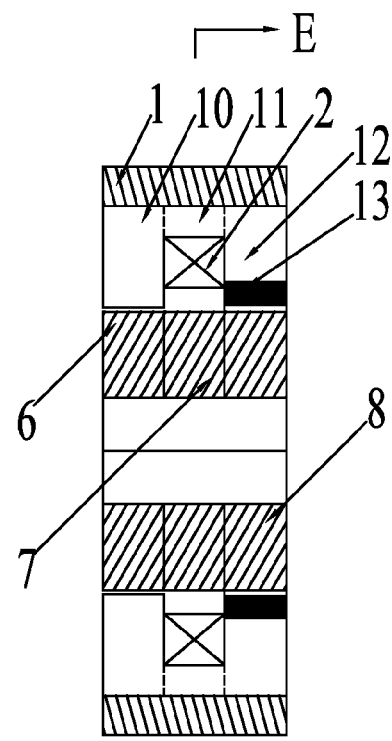
FIG. 14 is a sectional side view of an armature unit of a magnetic field modulated transverse flux multiphase permanent magnet motor according to a fifth preferred embodiment of the present invention.
Figure 15:
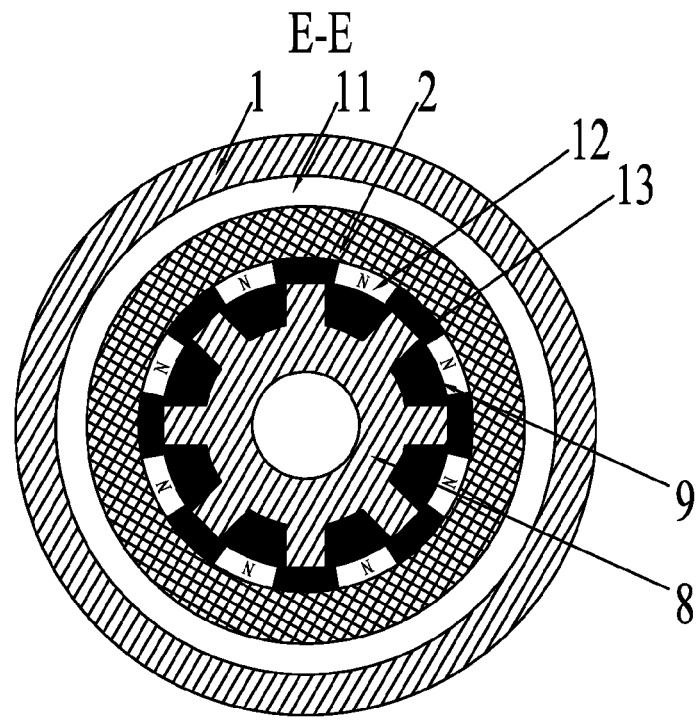
FIG. 15 is a sectional view of the armature unit of the magnetic field modulated transverse flux multiphase permanent magnet motor along plane E-E of FIG. 14.
Figure 16:
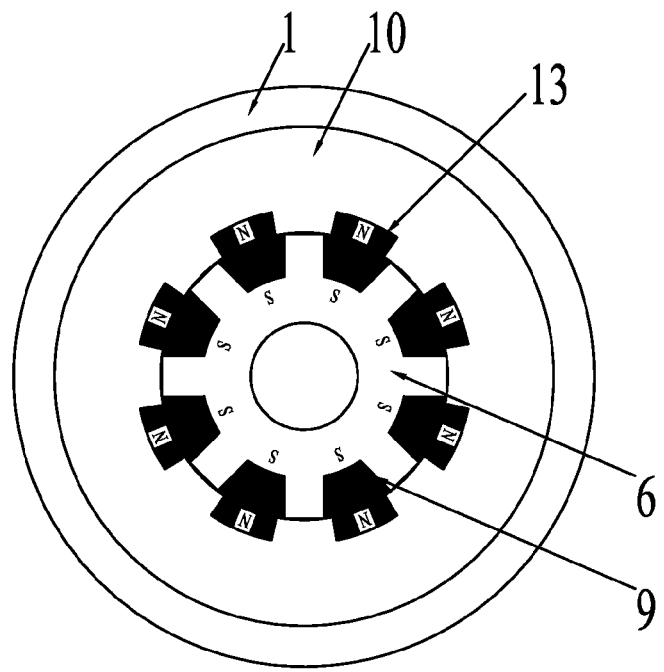
FIG. 16 is a right side view of the armature unit of the magnetic field modulated transverse flux multiphase permanent magnet motor according to the fifth preferred embodiment of the present invention.

Referring to FIG. 11 to FIG. 13 of the drawings, schematic diagrams of a magnetic field modulated transverse flux multiphase permanent magnet motor are illustrated, in which it comprises a stator and a rotor, wherein the stator and the rotor is spaced apart from each other to form an air gap therebetween. The stator comprises a stator casing 1 and m armature units, where m is the number of phases of the magnetic field modulated transverse flux multiphase permanent magnet motor, and m≥3. The stator casing 1 is tubular in structure. Each of the armature units comprises an armature core, an armature winding 2, and k stator permanent magnets 13, where k is an even number. The armature core has a first armature core section 10, a second armature core section 11, and a third armature core section 12. Each of the first armature core section 10, the second armature core section 11, and the third armature core section 12 has an annular structure or cross section and has the same external diameter. Moreover, the second armature core section 11 is positioned between the first armature core section 10 and the third armature core section 12, wherein an internal diameter of the second armature core section 11 is greater than that of the first armature core section 10 and the third armature core section 12, while an internal diameter of the first armature core section 10 is the same as that of the third armature core section 12. The first armature core section 10, the second armature core section 11, and the third armature core section 12 are eccentrically arranged so that they share the same central longitudinal axis, and are sequentially and securely supported in the core casing 1 along a longitudinal direction thereof. Each of the first armature core section 10 and the third armature core section 12 has a k/2 stator core slots formed on an inner circumferential surface of the corresponding armature core section. The k/2 stator core slots of the first armature core section 10 are evenly distributed along a circumferential direction thereof. Similarly, the k/2 stator core slots of the third armature core section 12 are evenly distributed along a circumferential direction thereof. The stator core slots formed on the first armature core section 10 are symmetrically distributed with respect to the stator core slots formed on the third armature core section 12. The k stator permanent magnets 13 are received in the stator core slots of the first armature core section 10 and the third armature core section 12 respectively. Each of the stator permanent magnets 13 is elongated in shape and may be arranged to create radial magnetization or parallel magnetization. The stator permanent magnets 13 have the same direction or polarity of magnetization. In other words, the polarity of each pole of each of the stator permanent magnets 13 with respect to the stator is the same. Thus, each of the stator permanent magnets 13 may have its N-pole or S-pole facing toward the air gap formed between the rotor and the stator. The armature winding 2 is embedded in a space formed between the first armature core section 10, the second armature core section 11, and the third armature core section 12. The m armature units are sequentially and securely supported in the core casing 1 along a longitudinal direction thereof. Each of the armature units is distributed along the circumferential direction of the stator casing 1 in such a manner that each of the armature units has an electrical angle of 360°/m. The rotor comprises a rotor core and k rotor permanent magnets 9, where k is an even number. The rotor core has a first rotor core section 6, a second rotor core section 7, and a third rotor core section 8. Each of the first rotor core section 6, the second rotor core section 7 and the third rotor core section 8 is annular in structure, and they have the same internal diameter. The second rotor core section 7 is positioned between the first rotor core section 6 and the third rotor core section 8, wherein an external diameter of the second rotor core section 7 is smaller than an external diameter of the first rotor core section 6 and an external diameter of the third rotor core section 8. Note that the external diameter of the first rotor core section 6 is the same as that of the third rotor core section 8. The first rotor core section 6, the second rotor core section 7 and the third rotor core section 8 are eccentrically arranged so that they share the same central longitudinal axis. A thickness $t_6$ of the first rotor core section 6 is the same as a thickness $t_{10}$ of the first armature core section 10, while a thickness $t_7$ of the second rotor core section 7 is the same as a thickness $t_{11}$ of the second armature core section 11, and a thickness $t_8$ of the third rotor core section 8 is the same as a thickness $t_{12}$ of the third armature core section 12. Each of the first rotor core section 6 and the third rotor core section 8 further has k/2 magnet receiving slots longitudinally formed on an outer circumferential surface of the first rotor core section 6 and the third rotor core section 8, in such a manner that the k/2 magnet receiving slots of the first rotor core section 6 are evenly distributed along a circumferential direction thereof, while the k/2 magnet receiving slots of the third rotor core section 8 are also evenly distributed along a circumferential direction thereof. With respect to the radial direction of the rotor, the magnet receiving slots of the first rotor core section 6 are arranged not to be aligned (i.e. offset) with the magnet receiving slots of the third rotor core section 8 by a half pitch distance. The magnet receiving slots of the first rotor core section 6 correspond to (i.e. are aligned with) the stator core slots of the first armature core section 10 respectively, while the magnet receiving slots of the third rotor core section 8 correspond to (i.e. aligned with) the stator core slots of the third armature core section 12 respectively. In other words, the magnet receiving slots are positioned to correspond to the positions of the stator core slots respectively. The rotor permanent magnets 9 are received in the magnet receiving slots respectively. Each of the rotor permanent magnets 9 is elongated in shape and may be arranged to create radial magnetization or parallel magnetization. The rotor permanent magnets 9 have the same direction or polarity of magnetization. In other words, the polarity of each pole of each of the rotor permanent magnets 9 with respect to the rotor is the same. Thus, each of the rotor permanent magnets 9 may have its N-pole or S-pole facing toward the air gap formed between the rotor and the stator. The rotor permanent magnets 9 and the stator permanent magnets 13 have the same magnetization direction.

Embodiment 5

Referring to FIG. 11 to FIG. 13 of the drawings, schematic diagrams of a magnetic field modulated transverse flux multiphase permanent magnet motor are illustrated, in which it comprises a stator and a rotor, wherein the stator and the rotor is spaced apart from each other to form an air gap therebetween. The stator comprises a stator casing 1 and m armature units, where m is the number of phases of the magnetic field modulated transverse flux multiphase permanent magnet motor, and m≥3. The stator casing 1 is tubular in structure. Each of the armature units comprises an armature core, an armature winding 2, and k stator permanent magnets 13, where k is an even number. The armature core has a first armature core section 10, a second armature core section 11, and a third armature core section 12. Each of the first armature core section 10, the second armature core section 11, and the third armature core section 12 has an annular structure or cross section and has the same external diameter. Moreover, the second armature core section 11 is positioned between the first armature core section 10 and the third armature core section 12, wherein an internal diameter of the second armature core section 11 is greater than that of the first armature core section 10 and the third armature core section 12, while an internal diameter of the first armature core section 10 is the same as that of the third armature core section 12. The first armature core section 10, the second armature core section 11, and the third armature core section 12 are eccentrically arranged so that they share the same central longitudinal axis, and are sequentially and securely supported in the core casing 1 along a longitudinal direction thereof. Each of the first armature core section 10 and the third armature core section 12 has a k/2 stator core slots formed on an inner circumferential surface of the corresponding armature core section. The k/2 stator core slots of the first armature core section 10 are evenly distributed along a circumferential direction thereof. Similarly, the k/2 stator core slots of the third armature core section 12 are evenly distributed along a circumferential direction thereof. With respect to the circumferential direction of the stator, the stator core slots formed on the first armature core section 10 are arranged not to be aligned (i.e. offset) with the stator core slots formed on the third armature core section 12 by a half pitch distance. The k stator permanent magnets 13 are received in the stator core slots of the first armature core section 10 and the third armature core section 12 respectively. Each of the stator permanent magnets 13 is elongated in shape and may be arranged to create radial magnetization or parallel magnetization. The stator permanent magnets 13 have the same direction or polarity of magnetization direction. In other words, the polarity of each pole of each of the stator permanent magnets 13 with respect to the stator is the same. Thus, each of the stator permanent magnets 13 may have its N-pole or S-pole facing toward the air gap formed between the rotor and the stator. The armature winding 2 is embedded in a space formed between the first armature core section 10, the second armature core section 11, and the third armature core section 12. The m armature units are sequentially and securely supported in the core casing 1 along a longitudinal direction thereof. Each of the armature units is distributed along the circumferential direction of the stator casing 1 in such a manner that each of the armature units has an electrical angle of 360°/m. The rotor is tubular in structure, and has k/2 magnet receiving slots longitudinally and evenly formed on an outer circumferential surface of the rotor. The rotor permanent magnets 9 are received in the magnet receiving slots respectively. Each of the rotor permanent magnets 9 is elongated in shape and may be arranged to create radial magnetization or parallel magnetization. The rotor permanent magnets 9 have the same direction or polarity of magnetization.

Embodiment 6 the difference between the sixth embodiment and the first through fifth embodiment embodiments described above is that the armature core and the rotor core are configured by magnetic material having high permeability. The other structures and features of the sixth embodiment of the present invention is similar to the first through fifth embodiment of the present invention as described above.

Embodiment 7 the difference between the seventh embodiment and the first through fifth embodiment embodiments described above is that the stator casing 1 is configured by non-magnetic material. The other structures and features of the seventh embodiment of the present invention is similar to the first through fifth embodiment of the present invention as described above.

Embodiment 8 the difference between the eighth embodiment and the first through fifth embodiment embodiments described above is that the number of armature units of the stator is greater than or equal to one. The armature units having the same phase are positioned correspondingly along a circumferential direction of the stator. The other structures and features of the eighth embodiment of the present invention is similar to the first through fifth embodiment of the present invention as described above.

Embodiment 9 the difference between the ninth embodiment and the first through fifth embodiment embodiments described above is that the magnetic field modulated transverse flux multiphase permanent magnet motor utilizes internal rotor structure. The other structures and features of the ninth embodiment of the present invention is similar to the first through fifth embodiment of the present invention as described above.

Embodiment 10 the difference between the tenth embodiment and the first through fifth embodiment embodiments described above is that the magnetic field modulated transverse flux multiphase permanent magnet motor utilizes external rotor structure. The other structures and features of the tenth embodiment of the present invention is similar to the first through fifth embodiment of the present invention as described above.

Embodiment 11 the difference between the eleventh embodiment and the first through fifth embodiment embodiments described above is that the magnetic field modulated transverse flux multiphase permanent magnet motor comprises two rotors. The other structures and features of the eleventh embodiment of the present invention is similar to the first through fifth embodiment of the present invention as described above.

Embodiment 12 the difference between the twelfth embodiment and the first through fifth embodiment embodiments described above is that the magnetic field modulated transverse flux multiphase permanent magnet motor comprises two stators. The other structures and features of the twelfth embodiment of the present invention is similar to the first through fifth embodiment of the present invention as described above.

What is claimed is:

1. A magnetic field modulated transverse flux multiphase permanent magnet motor, comprising a stator and a rotor, wherein said stator and said rotor are spaced apart from each other to form an air gap therebetween, said stator comprising a stator casing (1) and m armature units, where m is a number of phases of said magnetic field modulated transverse flux multiphase permanent magnet motor, and m≥3, each of said armature units comprising an armature core and an armature winding (2), wherein each of said armature cores comprises n stator core teeth, wherein n is an integer, each of said stator core teeth having a first stator teeth section (3), a second stator teeth section (4), and a third stator teeth section (5), wherein each of said first stator teeth section (3), said second stator teeth section 4, and said third stator teeth section (5) has an annular structure and has a same external diameter, said second stator teeth section (4) being provided between said first stator teeth section (3) and said third stator teeth section (5), wherein an internal diameter of said second stator teeth section (4) is greater than that of said first stator teeth section (3) and said third stator teeth section (5), while an internal diameter of said first stator teeth section (3) is the same as that of said third stator teeth section (5), said first stator teeth section (3), said second stator teeth section (4), and said third stator teeth section (5) being eccentrically arranged to share a common central longitudinal axis, said armature winding (2) being embedded in a space formed between said first stator teeth section (3), said second stator teeth section (4) and said third stator teeth section (5), said stator casing (1) being tubular in structure, and having a plurality of casing slots (100) forming on an inner surface thereof, wherein said casing slots (100) are longitudinally formed along a longitudinal direction of said stator casing (1), wherein a number of casing slots (100) formed on said stator casing (1) is equal to a number of said stator core teeth, said stator core teeth being engaged with said casing slots respectively from a circumferential direction of said stator casing (1), wherein a transverse depth of each of said stator core teeth is greater than or equal to a transverse depth of said corresponding casing slot of said stator casing (1), said armature units being sequentially arranged along a longitudinal direction of said stator casing (1), wherein each of said armature units are distributed along said circumferential direction of said stator casing (1) in such a manner that each of said armature units has an electrical angle of 360°/m, said rotor comprising a rotor core and k rotor permanent magnets (9), where k is an even number, wherein said rotor core has a first rotor core section (6), a second rotor core section (7), and a third rotor core section (8), each of said first rotor core section (6), said second rotor core section (7) and said third rotor core section (8) being annular in structure, and having an identical internal diameter, wherein said second rotor core section (7) is positioned between said first rotor core section (6) and said third rotor core section (8), wherein an external diameter of said second rotor core section (7) is smaller than an external diameter of said first rotor core section (6) and an external diameter of said third rotor core section (8), while said external diameter of said first rotor core section (6) is identical to that of said third rotor core section (8), said first rotor core section (6), said second rotor core section (7) and said third rotor core section (8) being eccentrically arranged to share a common central longitudinal axis, wherein a thickness of said first rotor core section (6) is identical to that of said first stator teeth section (3), while a thickness of said second rotor core section (7) is identical to that of said second stator teeth section (4), and a thickness of said third rotor core section (8) is identical to that of said third stator teeth section (5), wherein for each of said armature units, said first rotor core section (6), said second rotor core section (7), and said third rotor core section (8) of said rotor core are aligned with said corresponding first stator teeth section (3), said fourth stator teeth section (4), and said third stator teeth section (5) respectively, each of said first rotor core section (6) and said third rotor core section (8) further having k/2 magnet receiving slots longitudinally forming on an outer circumferential surface of said first rotor core section (6) and said third rotor core section (8), in such a manner that said k/2 magnet receiving slots of said first rotor core section (6) are evenly distributed along a circumferential direction thereof, while said k/2 magnet receiving slots of said third rotor core section (8) are evenly distributed along a circumferential direction thereof, wherein with respect to said longitudinal direction of said rotor, said magnet receiving slots of said first rotor core section (6) are arranged not to be aligned with said magnet receiving slots of said third rotor core section (8), said rotor permanent magnets (9) being received in said magnet receiving slots respectively, wherein each of said rotor permanent magnets (9) is elongated in shape and is arranged to create one of radial magnetization and parallel magnetization, said rotor permanent magnets (9) having identical direction of magnetization, so that a polarity of each pole of each of said rotor permanent magnets (9) with respect to said rotor is identical, wherein each of said rotor permanent magnets (9) has one of a N-pole and a S-pole facing toward said air gap formed between said rotor and said stator.

2. The magnetic field modulated transverse flux multiphase permanent magnet motor, as recited in claim 1, wherein said armature core and said rotor core are configured by magnetic material having high permeability.

3. The magnetic field modulated transverse flux multiphase permanent magnet motor, as recited in claim 1, wherein said stator casing (1) is configured by a non-magnetic material.

4. The magnetic field modulated transverse flux multiphase permanent magnet motor, as recited in claim 1, wherein a number of said armature units of said stator is greater than or equal to one, said armature units having a same phase are positioned correspondingly along a circumferential direction of said stator.

5. A magnetic field modulated transverse flux multiphase permanent magnet motor, comprising a stator and a rotor, wherein said stator and said rotor are spaced apart from each other to form an air gap therebetween, said stator comprising a stator casing (1) and m armature units, where m is a number of phases of said magnetic field modulated transverse flux multiphase permanent magnet motor, and m≥3, said stator casing (1) being tubular in structure, each of said armature units comprising an armature core and an armature winding (2), wherein each of said armature cores has a first armature core section (10), a second armature core section (11), and a third armature core section (12), each of said first armature core section (10), said second armature core section (11), and said third armature core section (12) having an annular structure and an identical external diameter, said second armature core section (11) being positioned between said first armature core section (10) and said third armature core section (12), wherein an internal diameter of said second armature core section (11) is greater than that of said first armature core section (10) and said third armature core section (12), while an internal diameter of said first armature core section (10) is identical to that of said third armature core section (12), said first armature core section (10), said second armature core section (11), and said third armature core section (12) being eccentrically arranged to share said a common central longitudinal axis, and being sequentially and securely supported in said core casing (1) along a longitudinal direction thereof, said first armature core section (10) and said third armature core section (12) having a plurality of stator core slots formed on an inner circumferential surface of said first armature core section (10) and said third armature core section (12), wherein a number of said stator core slots forming on said first armature core section (10) is equal to a number of said stator core slots forming on said third armature core section (12), wherein said stator core slots of said first armature core section (10) are evenly distributed along a circumferential direction thereof, while said stator core slots of said third armature core section (12) are evenly distributed along a circumferential direction thereof, wherein said stator core slots forming on said first armature core section (10) are symmetrically distributed with respect to said stator core slots forming on said third armature core section (12), said armature winding (2) being embedded in a space formed between said first armature core section (10), said second armature core section (11), and said third armature core section (12), wherein said m armature units are sequentially and securely supported in said core casing (1) along a longitudinal direction thereof, each of said armature units being distributed along a circumferential direction of said stator casing (1) in such a manner that each of said armature units has an electrical angle of 360°/m, said rotor comprising a rotor core and k rotor permanent magnets (9), where k is an even number, said rotor core having a first rotor core section (6), a second rotor core section (7), and a third rotor core section (8), each of said first rotor core section (6), said second rotor core section (7) and said third rotor core section (8) being annular in structure, and having an identical internal diameter, wherein said second rotor core section (7) is positioned between said first rotor core section (6) and said third rotor core section (8), wherein an external diameter of said second rotor core section (7) is smaller than an external diameter of said first rotor core section (6) and an external diameter of said third rotor core section (8), while said external diameter of said first rotor core section (6) is identical to that of said third rotor core section (8), said first rotor core section (6), said second rotor core section (7) and said third rotor core section (8) being eccentrically arranged to share a common central longitudinal axis, wherein a thickness of said first rotor core section (6) is identical to that of said first armature core section (10), while a thickness of said second rotor core section (7) is identical to that of said second armature core section (11), and a thickness of said third rotor core section (8) is identical to that of said third armature core section (12), each of said first rotor core section (6) and said third rotor core section (8) further having k/2 magnet receiving slots longitudinally forming on an outer circumferential surface of said first rotor core section (6) and said third rotor core section (8), in such a manner that said k/2 magnet receiving slots of said first rotor core section (6) are evenly distributed along a circumferential direction thereof, while said k/2 magnet receiving slots of said third rotor core section (8) are evenly distributed along a circumferential direction thereof, said magnet receiving slots of said first rotor core section (6) being arranged not to be aligned with said magnet receiving slots of said third rotor core section (8) with respect to said longitudinal direction of said rotor, wherein said magnet receiving slots of said first rotor core section (6) are aligned with said stator core slots of said first armature core section (10) respectively, while said magnet receiving slots of said third rotor core section (8) are aligned with said stator core slots of said third armature core section (12) respectively, such that said magnet receiving slots are positioned to correspond to said positions of said stator core slots respectively, said rotor permanent magnets (9) being received in said magnet receiving slots respectively, wherein each of said rotor permanent magnets (9) is elongated in shape and is arranged to create one of radial magnetization and parallel magnetization, said rotor permanent magnets (9) having identical direction of magnetization, so that a polarity of each pole of each of said rotor permanent magnets (9) with respect to said rotor is identical, wherein each of said rotor permanent magnets (9) has one of a N-pole and a S-pole facing toward said air gap formed between said rotor and said stator.

6. The magnetic field modulated transverse flux multiphase permanent magnet motor, as recited in claim 5, wherein said armature core and said rotor core are configured by magnetic material having high permeability.

7. The magnetic field modulated transverse flux multiphase permanent magnet motor, as recited in claim 5, wherein said stator casing (1) is configured by a non-magnetic material.

8. The magnetic field modulated transverse flux multiphase permanent magnet motor, as recited in claim 5, wherein a number of said armature units of said stator is greater than or equal to one, said armature units having a same phase are positioned correspondingly along a circumferential direction of said stator.

9. A magnetic field modulated transverse flux multiphase permanent magnet motor, comprising a stator and a rotor, wherein said stator and said rotor are spaced apart from each other to form an air gap therebetween, said stator comprising a stator casing (1) and m armature units, where m is a number of phases of said magnetic field modulated transverse flux multiphase permanent magnet motor, and m≥3, said stator casing (1) being tubular in structure, each of said armature units comprising an armature core and an armature winding (2), wherein each of said armature cores has a first armature core section (10), a second armature core section (11), and a third armature core section (12), each of said first armature core section (10), said second armature core section (11), and said third armature core section (12) having an annular structure and an identical external diameter, said second armature core section (11) being positioned between said first armature core section (10) and said third armature core section (12), wherein an internal diameter of said second armature core section (11) is greater than that of said first armature core section (10) and said third armature core section (12), while an internal diameter of said first armature core section (10) is identical to that of said third armature core section (12), said first armature core section (10), said second armature core section (11), and said third armature core section (12) being eccentrically arranged to share said a common central longitudinal axis, and being sequentially and securely supported in said core casing (1) along a longitudinal direction thereof, said first armature core section (10) and said third armature core section (12) having a plurality of stator core slots formed on an inner circumferential surface of said first armature core section (10) and said third armature core section (12), wherein said stator core slots are longitudinally formed along a longitudinal direction of said stator casing, wherein a number of said stator core slots forming on said first armature core section (10) is equal to a number of said stator core slots forming on said third armature core section (12), wherein stator core slots of said first armature core section (10) are evenly distributed along a circumferential direction thereof, while said stator core slots of said third armature core section (12) are evenly distributed along a circumferential direction thereof, wherein, said stator core slots of said first armature core section (10) are arranged not to be aligned with said stator core slots of said third armature core section (12) with respect to said radial direction of said stator, said armature winding (2) being embedded in a space formed between said first armature core section (10), said second armature core section (11), and said third armature core section (12), wherein said m armature units are sequentially and securely supported in said core casing (1) along a longitudinal direction thereof, each of said armature units being distributed along a circumferential direction of said stator casing (1) in such a manner that each of said armature units has an electrical angle of 360°/m, said rotor comprising a rotor core and k rotor permanent magnets (9), where k is an even number, said rotor core having a first rotor core section (6), a second rotor core section (7), and a third rotor core section (8), each of said first rotor core section (6), said second rotor core section (7) and said third rotor core section (8) being annular in structure, and having an identical internal diameter, wherein said second rotor core section (7) is positioned between said first rotor core section (6) and said third rotor core section (8), wherein an external diameter of said second rotor core section (7) is smaller than an external diameter of said first rotor core section (6) and an external diameter of said third rotor core section (8), while said external diameter of said first rotor core section (6) is identical to that of said third rotor core section (8), said first rotor core section (6), said second rotor core section (7) and said third rotor core section (8) being eccentrically arranged to share a common central longitudinal axis, wherein a thickness of said first rotor core section (6) is identical to that of said first armature core section (10), while a thickness of said second rotor core section (7) is identical to that of said second armature core section (11), and a thickness of said third rotor core section (8) is identical to that of said third armature core section (12), each of said first rotor core section (6) and said third rotor core section (8) further having k/2 magnet receiving slots longitudinally forming on an outer circumferential surface of said first rotor core section (6) and said third rotor core section (8), in such a manner that said k/2 magnet receiving slots of said first rotor core section (6) are evenly distributed along a circumferential direction thereof, while said k/2 magnet receiving slots of said third rotor core section (8) are evenly distributed along a circumferential direction thereof, wherein a number of said magnet receiving slots forming on said third rotor core section (8) is identical to a number of said stator core slots forming on said third armature core section (12), wherein said rotor permanent magnets (9) are received in said magnet receiving slots respectively, wherein each of said rotor permanent magnets (9) is elongated in shape and is arranged to create one of radial magnetization and parallel magnetization, said rotor permanent magnets (9) having identical direction of magnetization, so that a polarity of each pole of each of said rotor permanent magnets (9) with respect to said rotor is identical, wherein each of said rotor permanent magnets (9) has one of a N-pole and a S-pole facing toward said air gap formed between said rotor and said stator.

10. The magnetic field modulated transverse flux multiphase permanent magnet motor, as recited in claim 9, wherein said armature core and said rotor core are configured by magnetic material having high permeability.

11. The magnetic field modulated transverse flux multiphase permanent magnet motor, as recited in claim 9, wherein said stator casing (1) is configured by a non-magnetic material.

12. The magnetic field modulated transverse flux multiphase permanent magnet motor, as recited in claim 9, wherein a number of said armature units of said stator is greater than or equal to one, said armature units having a same phase are positioned correspondingly along a circumferential direction of said stator.

13. A magnetic field modulated transverse flux multiphase permanent magnet motor, comprising a stator and a rotor, wherein said stator and said rotor are spaced apart from each other to form an air gap therebetween, said stator comprising a stator casing (1) and m armature units, where m is a number of phases of said magnetic field modulated transverse flux multiphase permanent magnet motor, and m≥3, said stator casing (1) being tubular in structure, each of said armature units comprising an armature core and an armature winding (2), and k stator permanent magnets (13), where k is an even number, wherein each of said armature cores has a first armature core section (10), a second armature core section (11), and a third armature core section (12), each of said first armature core section (10), said second armature core section (11), and said third armature core section (12) having an annular structure and an identical external diameter, said second armature core section (11) being positioned between said first armature core section (10) and said third armature core section (12), wherein an internal diameter of said second armature core section (11) is greater than that of said first armature core section (10) and said third armature core section (12), while an internal diameter of said first armature core section (10) is identical to that of said third armature core section (12), said first armature core section (10), said second armature core section (11), and said third armature core section (12) being eccentrically arranged to share said a common central longitudinal axis, and being sequentially and securely supported in said core casing (1) along a longitudinal direction thereof, said first armature core section (10) and said third armature core section (12) having k/2 stator core slots forming on an inner circumferential surface of said first armature core section (10) and said third armature core section (12), wherein said stator core slots of said first armature core section (10) are evenly distributed along a circumferential direction thereof, while said stator core slots of said third armature core section (12) are evenly distributed along a circumferential direction thereof, wherein said stator core slots forming on said first armature core section (10) are symmetrically distributed with respect to said stator core slots forming on said third armature core section (12), said k stator permanent magnets (13) being received in said stator core slots of said first armature core section (10) and said third armature core section (12) respectively, wherein each of said stator permanent magnets (13) is elongated in shape and is arranged to create one of radial magnetization and parallel magnetization, said stator permanent magnets (13) having identical direction of magnetization, so that a polarity of each pole of each of said stator permanent magnets (13) with respect to said stator is identical, wherein each of said stator permanent magnets (13) has one of a N-pole and a S-pole facing toward said air gap formed between said rotor and said stator, said armature winding (2) being embedded in a space formed between said first armature core section (10), said second armature core section (11), and said third armature core section (12), wherein said m armature units are sequentially and securely supported in said core casing (1) along a longitudinal direction thereof, each of said armature units being distributed along a circumferential direction of said stator casing (1) in such a manner that each of said armature units has an electrical angle of 360°/m, said rotor comprising a rotor core and k rotor permanent magnets (9), where k is an even number, said rotor core having a first rotor core section (6), a second rotor core section (7), and a third rotor core section (8), each of said first rotor core section (6), said second rotor core section (7) and said third rotor core section (8) being annular in structure, and having an identical internal diameter, wherein said second rotor core section (7) is positioned between said first rotor core section (6) and said third rotor core section (8), wherein an external diameter of said second rotor core section (7) is smaller than an external diameter of said first rotor core section (6) and an external diameter of said third rotor core section (8), while said external diameter of said first rotor core section (6) is identical to that of said third rotor core section (8), said first rotor core section (6), said second rotor core section (7) and said third rotor core section (8) being eccentrically arranged to share a common central longitudinal axis, wherein a thickness of said first rotor core section (6) is identical to that of said first armature core section (10), while a thickness of said second rotor core section (7) is identical to that of said second armature core section (11), and a thickness of said third rotor core section (8) is identical to that of said third armature core section (12), each of said first rotor core section (6) and said third rotor core section (8) further having k/2 magnet receiving slots longitudinally forming on an outer circumferential surface of said first rotor core section (6) and said third rotor core section (8), in such a manner that said k/2 magnet receiving slots of said first rotor core section (6) are evenly distributed along a circumferential direction thereof, while said k/2 magnet receiving slots of said third rotor core section (8) are evenly distributed along a circumferential direction thereof, said magnet receiving slots of said first rotor core section (6) being arranged not to be aligned with said magnet receiving slots of said third rotor core section (8) with respect to said longitudinal direction of said rotor, wherein said magnet receiving slots of said first rotor core section (6) are aligned with said stator core slots of said first armature core section (10) respectively, while said magnet receiving slots of said third rotor core section (8) are aligned with said stator core slots of said third armature core section (12) respectively, such that said magnet receiving slots are positioned to correspond to said positions of said stator core slots respectively, said rotor permanent magnets (9) being received in said magnet receiving slots respectively, wherein each of said rotor permanent magnets (9) is elongated in shape and is arranged to create one of radial magnetization and parallel magnetization, said rotor permanent magnets (9) having identical direction of magnetization, so that a polarity of each pole of each of said rotor permanent magnets (9) with respect to said rotor is identical, wherein each of said rotor permanent magnets (9) has one of a N-pole and a S-pole facing toward said air gap formed between said rotor and said stator, said rotor permanent magnets (9) and said stator permanent magnets (13) have said an identical magnetization direction.

14. The magnetic field modulated transverse flux multiphase permanent magnet motor, as recited in claim 13, wherein said armature core and said rotor core are configured by magnetic material having high permeability.

15. The magnetic field modulated transverse flux multiphase permanent magnet motor, as recited in claim 13, wherein said stator casing (1) is configured by a non-magnetic material.

16. The magnetic field modulated transverse flux multiphase permanent magnet motor, as recited in claim 13, wherein a number of said armature units of said stator is greater than or equal to one, said armature units having a same phase are positioned correspondingly along a circumferential direction of said stator.

17. A magnetic field modulated transverse flux multiphase permanent magnet motor, comprising a stator and a rotor, wherein said stator and said rotor are spaced apart from each other to form an air gap therebetween, said stator comprising a stator casing (1) and m armature units, where m is a number of phases of said magnetic field modulated transverse flux multiphase permanent magnet motor, and m≥3, said stator casing (1) being tubular in structure, each of said armature units comprising an armature core and an armature winding (2), and k stator permanent magnets (13), where k is an even number, wherein each of said armature cores has a first armature core section (10), a second armature core section (11), and a third armature core section (12), each of said first armature core section (10), said second armature core section (11), and said third armature core section (12) having an annular structure and an identical external diameter, said second armature core section (11) being positioned between said first armature core section (10) and said third armature core section (12), wherein an internal diameter of said second armature core section (11) is greater than that of said first armature core section (10) and said third armature core section (12), while an internal diameter of said first armature core section (10) is identical to that of said third armature core section (12), said first armature core section (10), said second armature core section (11), and said third armature core section (12) being eccentrically arranged to share said a common central longitudinal axis, and being sequentially and securely supported in said core casing (1) along a longitudinal direction thereof, said first armature core section (10) and said third armature core section (12) having k/2 stator core slots forming on an inner circumferential surface of said first armature core section (10) and said third armature core section (12), wherein said stator core slots of said first armature core section (10) are evenly distributed along a circumferential direction thereof, while said stator core slots of said third armature core section (12) are evenly distributed along a circumferential direction thereof, said stator core slots forming on said first armature core section (10) being arranged not to be aligned with said stator core slots forming on said third armature core section (12) with respect to said circumferential direction of said stator, said k stator permanent magnets (13) being received in said stator core slots of said first armature core section (10) and said third armature core section (12) respectively, wherein each of said stator permanent magnets (13) is elongated in shape and is arranged to create one of radial magnetization and parallel magnetization, said stator permanent magnets (13) having identical direction of magnetization, so that a polarity of each pole of each of said stator permanent magnets (13) with respect to said stator is identical, wherein each of said stator permanent magnets (13) has one of a N-pole and a S-pole facing toward said air gap formed between said rotor and said stator, said armature winding (2) being embedded in a space formed between said first armature core section (10), said second armature core section (11), and said third armature core section (12), wherein said m armature units are sequentially and securely supported in said core casing (1) along a longitudinal direction thereof, each of said armature units being distributed along a circumferential direction of said stator casing (1) in such a manner that each of said armature units has an electrical angle of 360°/m, said rotor being tubular in structure, and having k/2 magnet receiving slots longitudinally and evenly forming on an outer circumferential surface of said rotor, said rotor further comprising a plurality of rotor permanent magnets (9) received in said magnet receiving slots respectively, wherein each of said rotor permanent magnets (9) is elongated in shape and is arranged to create one of radial magnetization and parallel magnetization, said rotor permanent magnets (9) having identical direction of magnetization, so that a polarity of each pole of each of said rotor permanent magnets (9) with respect to said rotor is identical, wherein each of said rotor permanent magnets (9) has one of a N-pole and a S-pole facing toward said air gap formed between said rotor and said stator, said rotor permanent magnets (9) and said stator permanent magnets (13) having an identical magnetization direction.

18. The magnetic field modulated transverse flux multiphase permanent magnet motor, as recited in claim 17, wherein said armature core and said rotor core are configured by magnetic material having high permeability.

19. The magnetic field modulated transverse flux multiphase permanent magnet motor, as recited in claim 17, wherein said stator casing (1) is configured by a non-magnetic material.

20. The magnetic field modulated transverse flux multiphase permanent magnet motor, as recited in claim 17, wherein a number of said armature units of said stator is greater than or equal to one, said armature units having a same phase are positioned correspondingly along a circumferential direction of said stator.

\* \* \* \* \*